United States Patent
Beck, Jr.

(10) Patent No.: US 9,242,335 B2
(45) Date of Patent: Jan. 26, 2016

(54) WHEEL RIM POLISHING TOOL

(71) Applicant: Donald C. Beck, Jr., Stroudsburg, PA (US)

(72) Inventor: Donald C. Beck, Jr., Stroudsburg, PA (US)

(*) Notice: Subject to any disclaimer, the term of this patent is extended or adjusted under 35 U.S.C. 154(b) by 16 days.

(21) Appl. No.: 13/961,864

(22) Filed: Aug. 7, 2013

(65) Prior Publication Data

US 2014/0080389 A1 Mar. 20, 2014

Related U.S. Application Data

(60) Provisional application No. 61/680,585, filed on Aug. 7, 2012.

(51) Int. Cl.
| | |
|---|---|
| *B24B 29/02* | (2006.01) |
| *B24B 23/08* | (2006.01) |
| *B24B 29/04* | (2006.01) |
| *B60S 3/04* | (2006.01) |

(52) U.S. Cl.
CPC .................. *B24B 29/02* (2013.01); *B24B 23/08* (2013.01); *B24B 29/04* (2013.01); *B60S 3/042* (2013.01)

(58) Field of Classification Search
CPC .......... B60S 3/042; B60S 3/066; B60S 3/045; B60S 7/20
USPC .................. 451/348; 15/53.1, 160
See application file for complete search history.

(56) References Cited

U.S. PATENT DOCUMENTS

| | | | | | |
|---|---|---|---|---|---|
| 2,548,809 | A | * | 4/1951 | Norman | 200/52 R |
| 2,832,085 | A | * | 4/1958 | Chamberlain | 15/21.1 |
| 2,915,766 | A | * | 12/1959 | Peterson | 15/21.1 |
| 2,975,447 | A | * | 3/1961 | Vuchinas | 15/53.4 |
| 3,008,168 | A | * | 11/1961 | Doyle | 15/230.15 |
| 3,071,863 | A | * | 1/1963 | MacMillan | 33/301 |
| 3,402,905 | A | * | 9/1968 | MacMillan | 248/205.1 |
| 4,527,300 | A | * | 7/1985 | Kunde et al. | 15/88.2 |
| 4,551,952 | A | * | 11/1985 | West | 451/439 |
| 6,776,698 | B2 | * | 8/2004 | Pepin et al. | 451/434 |
| 2008/0047085 | A1 | * | 2/2008 | Kolarevic et al. | 15/179 |
| 2011/0287701 | A1 | * | 11/2011 | McKee | 451/348 |

\* cited by examiner

*Primary Examiner* — Joel Crandall

(57) ABSTRACT

A wheel rim polishing tool simplifies the process of polishing tractor trailer wheel rims. The tool also reduces polishing time by polishing more surface area of the wheel rim per rotation as compared to what can be accomplished by hand or by means of a drill adapted with a polishing head. The tool further keeps the cost of polishing the wheel rims low by making a trip to a metal specialty shop no longer necessary. The wheel rim polishing tool is a portable device that allows the tractor trailer owner to polish their wheel rims quickly and easily.

7 Claims, 4 Drawing Sheets

WHEEL RIM POLISHING TOOL

CROSS-REFERENCE TO RELATED APPLICATION

This application claims the benefit of priority of U.S. provisional application No. 61/680,585, filed Aug. 7, 2012, the contents of which are herein incorporated by reference.

BACKGROUND OF THE INVENTION

The present invention relates to truck accessories and, more particularly, to a wheel rim polishing tool.

Currently, it is a very time consuming and laborious process to polish tractor trailer wheel rims. It usually entails hours of polishing by hand or using a drill adapted with a polishing head. The only other method currently available entails spending time and money at a metal specialty shop where they remove the tires in order to polish the wheel rims.

As can be seen, there is a need for an improved device for simplifying the wheel rim polishing process while reducing polishing time and keeping polishing costs under control.

SUMMARY OF THE INVENTION

In one aspect of the present invention, a wheel polisher for polishing wheel rims comprises a wheel cleaner frame; a polishing pad attached to one end of the wheel polishing frame; a bolt fitting through a central region of the wheel cleaner frame; a magnet supported in a magnet housing, the magnet and magnet housing supported by the bolt; and bearings disposed on the bolt, on each side of the wheel cleaner frame, the bearings allowing the wheel cleaner frame to rotate relative to the magnet and the magnet housing, the rotation of the wheel cleaner frame causing the polishing pad to rotate.

In another aspect of the present invention, a wheel polisher for polishing wheel rims comprises a wheel cleaner frame formed with an upper step connected to a lower step; a polishing pad removably attached to one end of the wheel polishing frame, the polishing pad attaches, at a first end, to the upper step and, at a second end, to the lower step; a bolt fitting through a central region of the wheel cleaner frame; a magnet supported in a magnet housing, the magnet and magnet housing supported by the bolt; a handle attached to the wheel cleaner frame, opposite the polisher pad; and bearings disposed on the bolt, on each side of the wheel cleaner frame, the bearings allowing the wheel cleaner frame to rotate relative to the magnet and the magnet housing, the rotation of the wheel cleaner frame causing the polishing pad to rotate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wheel rim polishing tool that simplifies the process of polishing tractor trailer wheel rims. The tool also reduces polishing time by polishing more surface area of the wheel rim per rotation as compared to what can be accomplished by hand or by means of a drill adapted with a polishing head. The tool further keeps the cost of polishing the wheel rims low by making a trip to a metal specialty shop no longer necessary. The wheel rim polishing tool is a portable device that allows the tractor trailer owner to polish their wheel rims quickly and easily.

Figure 1:
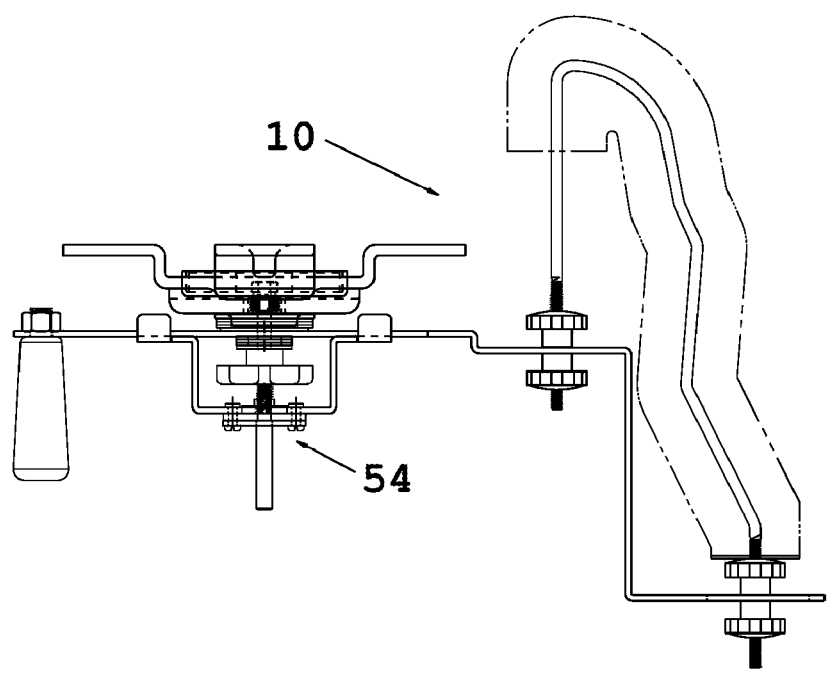
FIG. 1 is a side view of an assembled wheel rim polisher according to an exemplary embodiment of the present invention.
Figure 2:
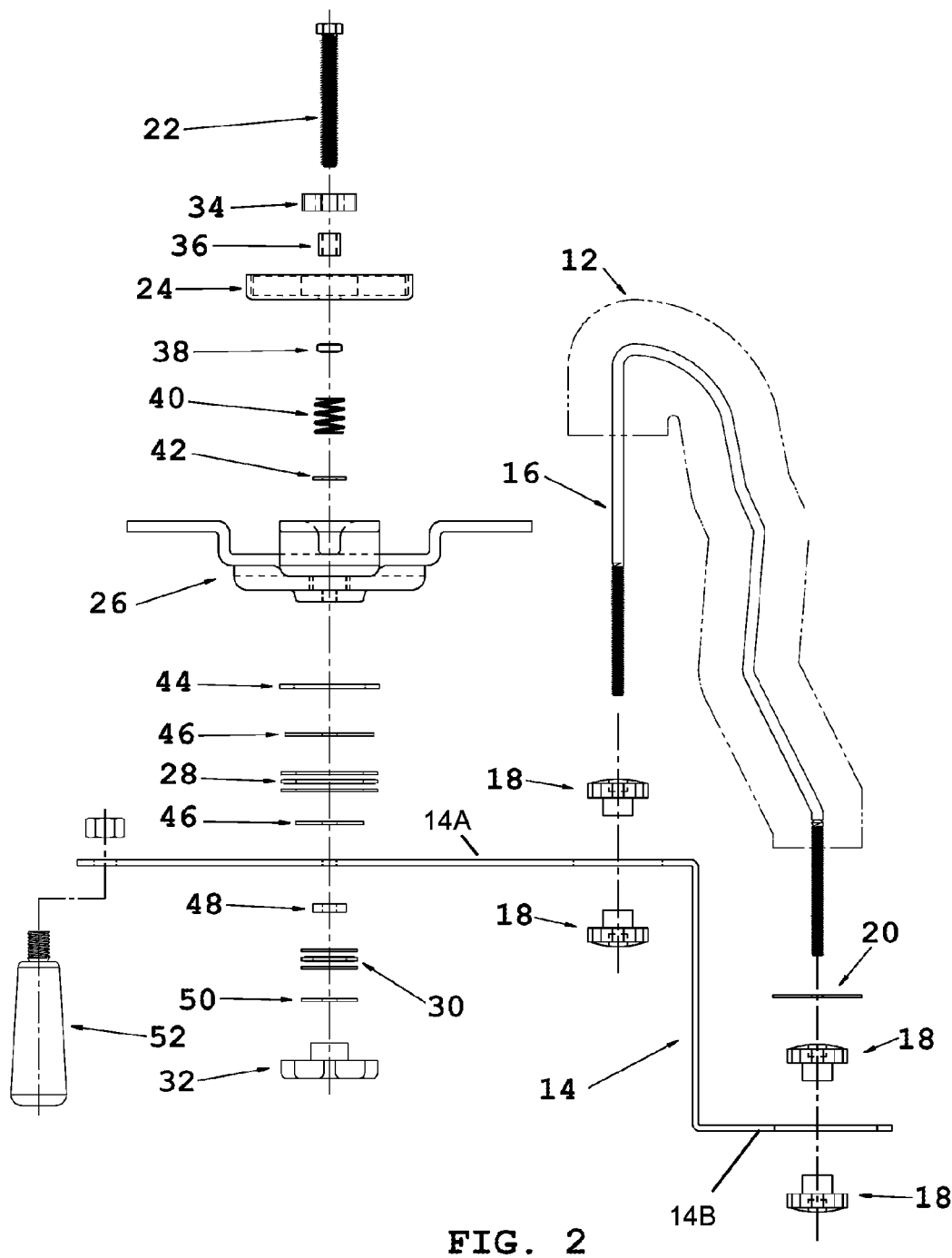
FIG. 2 is an exploded side view of the wheel rim polisher of FIG. 1.

Referring now to FIGS. 1 and 2, a wheel polisher 10 can include a polishing pad 12, such as a foam polishing pad that can rotate about a wheel rim (not shown) to clean and polish the wheel rim. A wheel cleaner frame 14 can support the polishing pad 12. Typically, the wheel cleaner frame 14 is shaped as a step where the polishing pad 12 can be attached at both the upper step 14A and the lower step 14B of the wheel cleaner frame 14. A polishing pad holder 16 can hold the polishing pad 12 in a desired shape. Ends of the polishing pad holder 16 can attach to the steps 14A, 14B of the wheel cleaner frame 14 by various methods. For example, the ends of the polishing pad holder 16 can be threaded and knobs 18 can be disposed on each side of the steps 14A, 14B to attach the polishing pad holder 16 thereto. Of course, other devices can be used in place of the knobs 18, such as wing nuts, hex nuts, or the like. A washer, such as a plastic washer 20 can be disposed between the knob 18 and the polishing pad 12.

A mounting system can be attached to the upper step 14A of the wheel cleaner frame 14. Typically the mounting system is attached in a central region of the upper step 14A. A bolt 22 can be extended through a magnet 24, disposed in a magnet housing 26. The bolt 22 can continue through an inner thrust bearing 28, through the wheel cleaner frame 14, through an outer thrust bearing 30 and terminate in a mounting knob 32 or the like. In some embodiments, the bolt can pass through a hex bolt retainer 34 and a slide bushing 36 disposed in the magnet 24. A hex nut 38, such as a lock nut, can be used to secure the magnet 24 to the bolt 22 before being placed in the housing 26. A spring 40 can be disposed on the bolt, between the magnet 24 and the housing 26 to permit the magnet to move slightly within the housing 26. A washer 42 can be disposed between the spring 40 and the housing 26.

Below the housing 26, a spacer bushing 44 can separate the housing from the inner thrust bearing 28. In addition, washers 46 can sandwich the inner thrust bearing 28. A bushing 48 and a washer 50 can sandwich the outer thrust bearing 30.

A handle 52 can be attached to the end of the upper step 14A, opposite the lower step 14B of the wheel cleaner frame 14. The handle 52 can attach, for example, with a nut, as shown, or some other connection mechanism. Typically, a lock nut can be used to allow the handle 52 to rotate relative to the wheel cleaner frame 14, providing a mechanism for a user to rotate the wheel cleaner frame 14 on the axis defined by the bolt 22.

Figure 3:
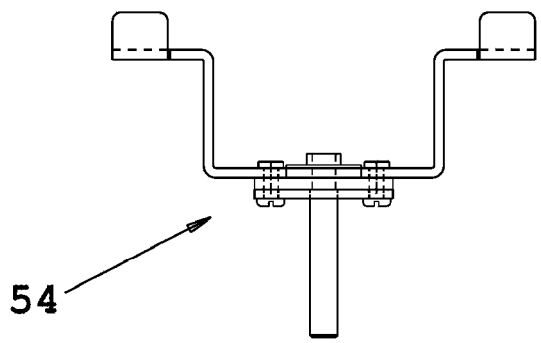
FIG. 3 is a side view of a drill adapter assembly for the wheel rim polisher according to an exemplary embodiment of the present invention.
Figure 4:
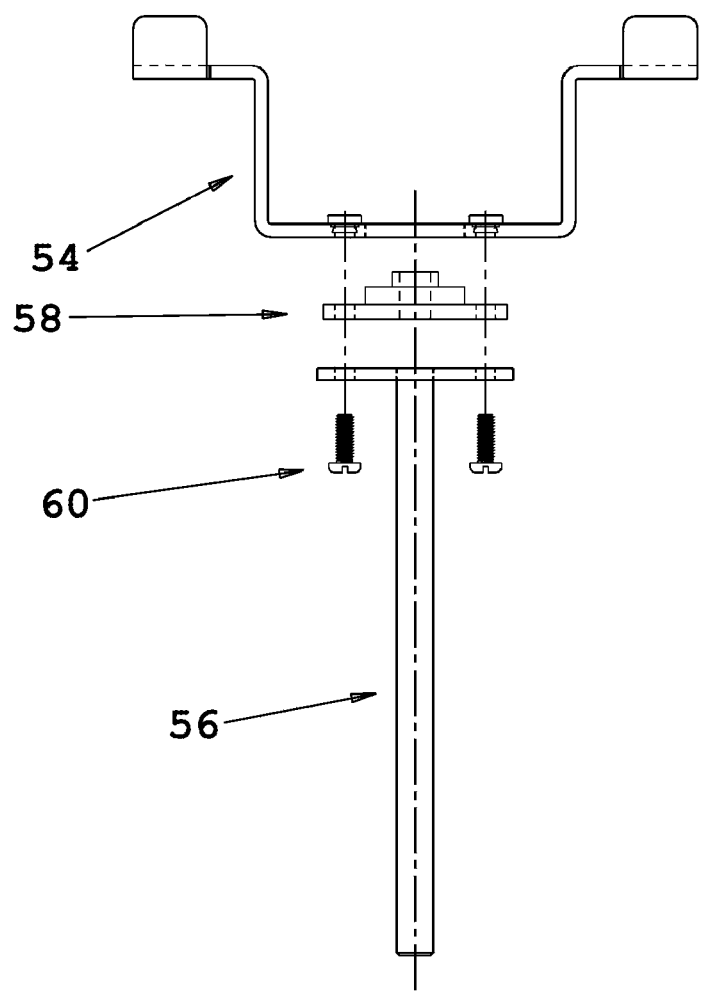
FIG. 4 is an exploded side view of the drill adapter assembly of FIG. 3.
Figure 5:
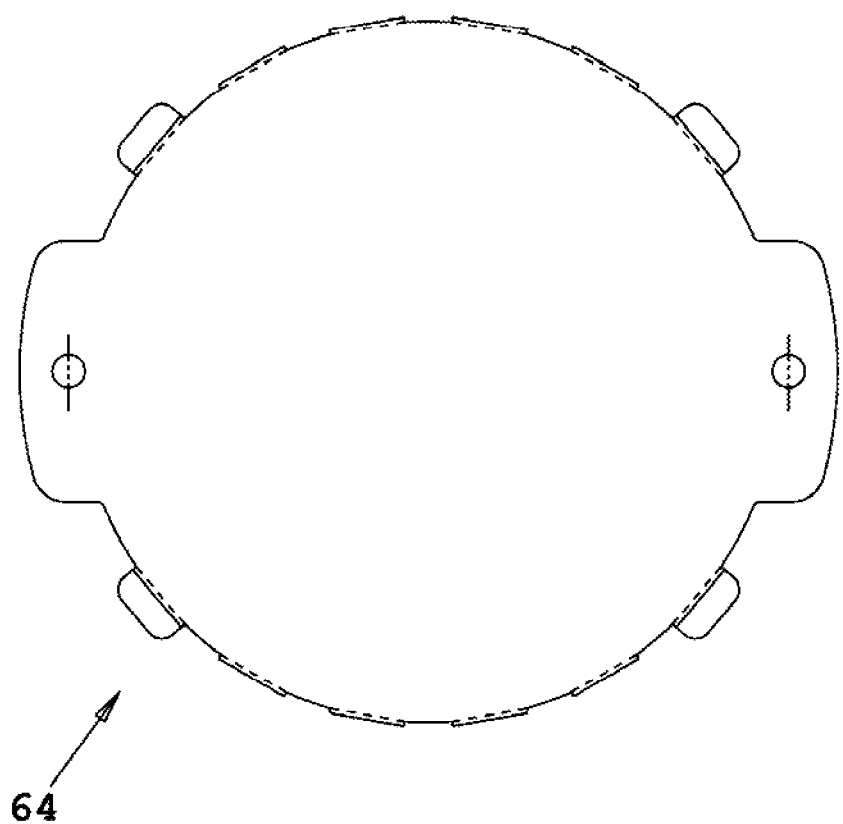
FIG. 5 is a front view of a wheel hub adapter optionally usable with the wheel rim polisher according to an exemplary embodiment of the present invention.
Figure 6:
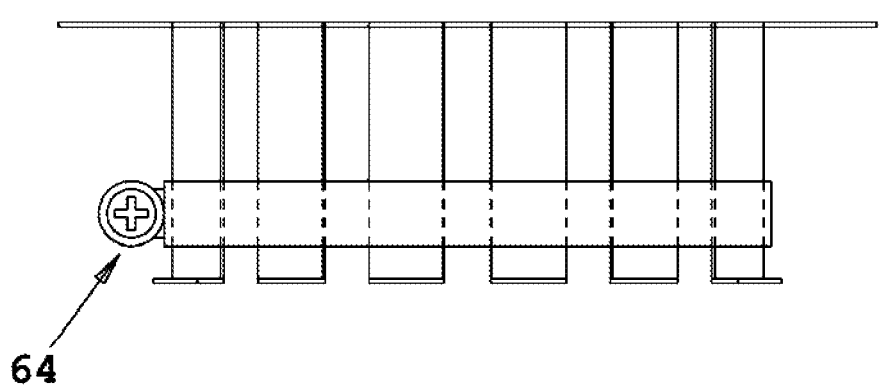
FIG. 6 is a top view of the wheel hub adapter of FIG. 5.

As shown in FIGS. 3 and 4, a drill adapter 54 can include a drill shaft 56 for connection to a drill (not shown). The drill adapter 54 can attach to the wheel cleaner frame 14 (as shown in FIG. 1) to allow a drill to turn the drill shaft 56 and, thus, the polishing pad 12. In some embodiments, a bearing 58 can be disposed between the drill adapter 54 and the drill shaft 56. Screws 60 can interconnect the drill shaft 56 with the bearing 58 and the drill adapter 54 as shown in FIG. 4.

In some embodiments, the magnet 24 and housing 26 may not properly attach to the wheel hub. A wheel adapter 64 can be attached to the wheel hub (not shown) to allow a secure connection of the magnet 24 thereto.

In use, the assembled wheel polisher 10 works to achieve an excellent polish on tractor trailer wheel rims in a short period of time. The inner and outer thrust bearings 28, 30 (needle bearings) allow for the effective actuation and rotation of the tool while the magnet 24 secures the tool to the tractor trailer wheel hub (with the optional wheel adapter 64, if needed). Turning the handle 52 (or rotating the wheel cleaner frame 14 with the drill adapter 54) allows the polishing pad 12 to turn against the wheel rim, effectively cleaning and polishing the wheel rim.

While a particular shape and size of the device is shown in the drawings, the tool can be reconfigured in a particular shape to allow effective contact to the wheel rim. A user can simply use the knobs 18 to remove and replace the polishing pad 12 as needed.

It should be understood, of course, that the foregoing relates to exemplary embodiments of the invention and that modifications may be made without departing from the spirit and scope of the invention as set forth in the following claims.

What is claimed is:

1. A wheel polisher for polishing wheel rims, comprising:
   a wheel cleaner frame formed with an upper step protrusion and a lower step protrusion integrally connected to opposite ends of a riser member, wherein each protrusion protrudes in opposite directions of each other;
   a polishing pad attached to one end of the wheel polishing frame, wherein the polishing pad attaches, at a first end, to the upper step protrusion and, at a second end, to the lower step protrusion;
   a bolt fitting through a central region of the wheel cleaner frame;
   a magnet supported in a magnet housing, the magnet and magnet housing supported by the bolt; and
   bearings disposed on the bolt, on each side of the wheel cleaner frame, the bearings allowing the wheel cleaner frame to rotate relative to the magnet and the magnet housing, the rotation of the wheel cleaner frame causing the polishing pad to rotate.

2. The wheel polisher of claim 1, wherein the polishing pad is removably attached to the wheel cleaner frame with a plurality of knobs.

3. The wheel polisher of claim 1, further comprising a drill attachment attached to the wheel cleaner frame, the drill attachment having a shaft fitting into a drill, wherein turning the drill turns the shaft, turns the drill attachment, and turns the wheel cleaner frame.

4. The wheel polisher of claim 1, further comprising a wheel adaptor fitting over a wheel hub, the wheel adaptor providing a surface for the magnet to attach.

5. A wheel polisher for polishing wheel rims, comprising:
   a wheel cleaner frame formed with an upper step protrusion and a lower step protrusion integrally connected to opposite ends of a riser member, wherein each protrusion protrudes in opposite directions of each other;
   a polishing pad removably attached to one end of the wheel polishing frame, the polishing pad attaches, at a first end, to the upper step protrusion and, at a second end, to the lower step protrusion;
   a bolt fitting through a central region of the wheel cleaner frame;
   a magnet supported in a magnet housing, the magnet and magnet housing supported by the bolt;
   a handle attached to the wheel cleaner frame, opposite the polisher pad; and
   bearings disposed on the bolt, on each side of the wheel cleaner frame, the bearings allowing the wheel cleaner frame to rotate relative to the magnet and the magnet housing, the rotation of the wheel cleaner frame causing the polishing pad to rotate.

6. The wheel polisher of claim 5, further comprising a drill attachment attached to the wheel cleaner frame, the drill attachment having a shaft fitting into a drill, wherein turning the drill turns the shaft, turns the drill attachment, and turns the wheel cleaner frame.

7. The wheel polisher of claim 5, further comprising a wheel adaptor fitting over a wheel hub, the wheel adaptor providing a surface for the magnet to attach.

* * * * *